United States Patent Office 2,922,790
Patented Jan. 26, 1960

2,922,790

S-(2-PYRIDYL-1-OXIDE)-S'-TRICHLOROMETHYL DISULFIDE AND SALTS

Jack Rockett, Metuchen, N.J., and Bernard B. Brown, Hamden, Conn., assignors to Olin Mathieson Chemical Corporation, New Haven, Conn., a corporation of Virginia No Drawing. Application January 6, 1958
Serial No. 707,096

5 Claims. (Cl. 260—294.8)

This invention relates to a new group of chemical compounds and to processes for their preparation. More particularly, this invention relates to novel derivatives of 2-mercaptopyridine-1-oxide.

The compounds of the present invention comprise S-(2-pyridyl-1-oxide)-S'-trichloromethyl disulfide and the acid addition salts thereof. S-(2-pyridyl-1-oxide)-S'-trichloromethyl disulfide is represented by the following formula:

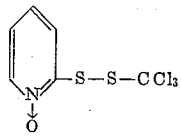

The acid addition salts of the compound are formed by addition on the oxygen atom, as represented by the following formula for the hydrochloride salt:

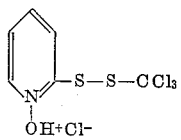

The free base is readily liberated from its combination in the acid addition salts by simply triturating the salt in water, as shown in the following formula:

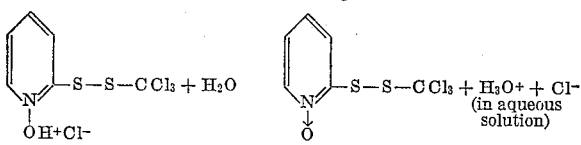

The compound herein referred to as 2-mercaptopyridine-1-oxide, although represented here as:

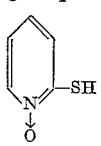

is actually more accurately represented as a tautomer of the following structures:

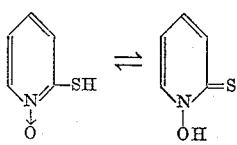

It has been found that S-(2-pyridyl-1-oxide)-S'-trichloromethyl disulfide displays biological activity and, in particular, that it possesses pesticidal properties desirable in soil and foliage fungicides. The synthesis of this compound and the testing thereof are illustrated in the following non-limitative, specific examples.

Example I

In a three necked flask equipped with dropping funnel, stirrer, thermometer and reflux condenser was placed 88.3 g. (0.474 mole) of perchloromethyl mercaptan and 100 cc. of ether. To it was added, dropwise, a solution of 60.3 g. (0.474 mole) of 2-mercaptopyridine-1-oxide in 500 cc. of ether. The temperature was kept at 20–34° by intermittent cooling with an ice bath. A yellow precipitate formed. When the addition was complete the flask was heated at reflux temperature for two hours and then permitted to cool. The flask contents were filtered and the fine yellow powder was washed several times with ether. After drying there was obtained 133.2 g. (0.426 mole) of S-(2-pyridyl-1-oxide)-S'-trichloromethyl disulfide hydrochloride, M.P. 85–119° C.; an 89.8% yield.

*Analysis.*—Calc'd. for $C_6H_5Cl_4NOS_2$: Cl, 45.3%. Found: Cl, 45.77%.

Example II

A 100 g. sample of the hydrochloride prepared in Example I, (0.320 mole) was triturated with 1500 cc. of water at 30–35° for one-half hour, cooled and filtered. The precipitate, a pale yellow powder, weighed 84.8 g. (0.307 mole), a 95.9% yield of S-(2-pyridyl-1-oxide)-S'-trichloromethyl disulfide. It was recrystallized from methanol and water to give fine needles, M.P. 99°.

*Analysis.*—Calc'd. for $C_6H_4Cl_3NOS_2$: S, 23.1%; Cl, 38.5%; N, 5.06%. Found: S, 23.10%; Cl, 38.97%; N, 5.03%.

Example III

In the following alternative process for the preparation of the free base, a single step synthesis replaced the two step process described in Examples I and II.

In a flask was placed 18.6 g. (0.1 mole) of perchloromethyl mercaptan and 100 cc. of ether. To it was added a solution of 12.5 g. (0.1 mole) of 2-mercaptopyridine-1-oxide, 15.8 g. (0.2 mole) of pyridine, and 100 cc. of ether. When the addition was complete the reaction mixture was heated to reflux for two hours. The solid precipitate of pyridine hydrochloride was filtered. The ether solution was washed with water, dried and evaporated to dryness. 10.2 g. of a crystalline residue was obtained. The product, S-(2-pyridyl-1-oxide)-S'-trichloromethyl disulfide, melts at 98–99° and is identical with the material obtained in Example II.

The compounds of this invention are adapted to be employed for the control of various pests, particularly of agricultural pests. The compounds may be mixed on an inert finely divided solid and employed as a dust. Suitable solid carriers are clay, talc, bentonite, as well as other carriers known in the art (see Frear, "Chemistry of Insecticides, Fungicides and Herbicides"). The compounds may also be applied as a spray in a liquid carrier either as a solution in a solvent or as a suspension in a non-solvent such as water. When applied as a suspension it may be desirable to incorporate wetting agents. The compounds of this invention may also be admixed with carriers that are themselves active, such as other parasiticides, herbicides and fertilizers.

In order to establish the biological activity of the compounds of this invention, tests were carried out using the hydrochloride salt as an agricultural fungicide.

Tests as soil fungicides were carried out by placing discs of agar cultures 5 mm. in diameter of the pathogenic fungi listed in the table below on Petri dish plates of potato dextrose agar containing 10,100 and 1000 parts, respectively, of the chemical being tested. The plates were then incubated for a sufficient length of time to give satisfactory growth of the fungi on control plates containing no chemical. The growth of the fungi on the test plates was then observed and noted as "0" for no growth, indicating a kill of the fungi; "—" for growth on the original inoculum only, indicating a decided depressing effect of fungus growth but no kill of the fungus, and "+" indicating no inhibition of fungal growth and, therefore, no pronounced depressing effect of the chemical being tested. In the tests recorded below, the growth was recorded after 48 hours' incubation at 20° C.

| Test Organism | Agar Test—Compound S-(2-pyridyl-1-oxide)-trichloromethyl disulfide hydrochloride, p.p.m. | | |
|---|---|---|---|
| | 10 | $10^2$ | $10^3$ |
| Fusarium solani | − | 0 | 0 |
| F. oxysporum f. lycopersici | − | 0 | 0 |
| Phytophthora cactorum | 0 | 0 | 0 |
| Phytophthora cinnamomi | 0 | 0 | 0 |
| Phytophthora citrophthora | 0 | 0 | 0 |
| Pythium aphanidermatum | 0 | 0 | 0 |
| Pythium ultimum | 0 | 0 | 0 |
| Rhizoctonia solani | + | + | 0 |
| Sclerotinia sclerotiorum | 0 | 0 | 0 |
| Sclerotium rolfsii | + | 0 | 0 |
| Verticillium albo-atrum | − | − | 0 |

Symbols: "+" growth; "−" growth only on inoculum; "0" no growth

The results recorded in the above table demonstrate that the compound is an active fungicidal agent.

Foliage fungicide tests, as described in "Phytopathology," volume 33, pages 627–632 (1943), and volume 37, pages 354–356 (1947), showed that a concentration of 0.21 part per million of the hydrochloride salt was effective for the inhibition of the germination of 50% of the spore of *Monolinia fructicola*, an organism which causes brown rot of stone fruit.

The foregoing tests indicate the utility of the novel compounds of this invention as biologically active agents, particularly as displaying useful fungicidal properties.

The invention having been disclosed, what is believed to be new and desired to be secured by Letters Patent is:

1. A compound selected from the group consisting of S-(2-pyridyl-1-oxide)-S'-trichloromethyl disulfide and the acid addition salts thereof.

2. S-(2-pyridyl-1-oxide)-S'-trichloromethyl disulfide.

3. S-(2-pyridyl-1-oxide)-S'-trichloromethyl disulfide hydrochloride.

4. A process for the preparation of S-(2-pyridyl-1-oxide)-S'-trichloromethyl disulfide which comprises reacting 2-mercaptopyridine-1-oxide with perchloromethyl mercaptan, liberating the hydrogen chloride from the salt which is formed, and recovering the compound in the form of the free base.

5. A process for the preparation of S-(2-pyridyl-1-oxide)-S'-trichloromethyl disulfide which comprises reacting 2-mercaptopyridine-1-oxide with perchloromethyl mercaptan in the presence of pyridine, and recovering the compound in the form of the free base.

References Cited in the file of this patent
UNITED STATES PATENTS

| | | |
|---|---|---|
| 2,553,777 | Hawley | May 21, 1951 |
| 2,685,786 | Shaw et al. | Aug. 17, 1954 |